US 8,295,957 B2

(12) United States Patent
Holzberg et al.

(10) Patent No.: US 8,295,957 B2
(45) Date of Patent: Oct. 23, 2012

(54) METHOD AND SYSTEM PROVIDING A CUSTOMIZED AUDIO PRESENTATION TAILORED TO A PREDETERMINED EVENT SEQUENCE

(75) Inventors: Roger Holzberg, Burbank, CA (US); Edward Kummer, Santa Monica, CA (US); Jeffrey Voris, Los Angeles, CA (US); Joshua Rhoades, West Hills, CA (US); Seth Mendelsohn, Simi Valley, CA (US); Jarett Smith, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1356 days.

(21) Appl. No.: 11/999,533

(22) Filed: Dec. 5, 2007

(65) Prior Publication Data

US 2009/0149976 A1 Jun. 11, 2009

(51) Int. Cl.
*G06F 17/00* (2006.01)
(52) U.S. Cl. .............. 700/94; 381/61; 363/30; 363/34; 363/35; 363/36; 434/308; 434/309; 434/318; 434/319; 434/321
(58) Field of Classification Search ............ 700/94
See application file for complete search history.

(56) References Cited

U.S. PATENT DOCUMENTS

| | | | |
|---|---|---|---|
| 5,307,456 A * | 4/1994 | MacKay | 715/782 |
| 5,389,992 A | 2/1995 | Weber | |
| 5,583,844 A | 12/1996 | Wolf | |
| 6,292,213 B1 | 9/2001 | Jones | |
| 7,706,904 B2 * | 4/2010 | Jones et al. | 700/94 |
| 7,786,371 B1 * | 8/2010 | Moates | 84/645 |
| 2005/0077843 A1 * | 4/2005 | Benditt | 315/312 |
| 2005/0152665 A1 * | 7/2005 | Shibata et al. | 386/4 |
| 2007/0106484 A1 * | 5/2007 | Sweatman et al. | 702/188 |
| 2008/0235494 A1 * | 9/2008 | Kamath et al. | 712/35 |
| 2008/0249874 A1 * | 10/2008 | Seo | 705/14 |

* cited by examiner

*Primary Examiner* — Paul McCord
(74) *Attorney, Agent, or Firm* — Farjami & Farjami

(57) ABSTRACT

There is provided a method of customizing an audio presentation for tailoring to a predetermined event sequence, one embodiment comprising identifying the predetermined event sequence from a predetermined event sequence database, associating a first audio asset with one or more selected events of the predetermined event sequence, synchronizing the timing of the first audio assets with the timing of the selected events, and linking the first audio assets to produce a customized audio presentation tailored to the predetermined event sequence. In one embodiment, the method includes downloading an interactive audio presentation content including an interactive audio presentation program, an audio assets database, and the predetermined event sequence database to a client computer. In one embodiment, a system for customizing an audio presentation tailored to a predetermined event sequence comprises a client computer, a client memory located on the client computer, and interactive audio presentation content.

23 Claims, 6 Drawing Sheets

METHOD AND SYSTEM PROVIDING A CUSTOMIZED AUDIO PRESENTATION TAILORED TO A PREDETERMINED EVENT SEQUENCE

BACKGROUND OF THE INVENTION

1. Field of the Invention

The present invention relates generally to computer mediated entertainment content. More particularly, the present invention relates to customizing audio entertainment content.

2. Background Art

The movie industry long ago recognized that a primarily visual sensory experience can be altered and enhanced by an accompanying audio soundtrack, edited to correspond to and complement the presentation of the visual imagery. Some of the most iconic cinematic images are rendered so unforgettable at least in part because of the dramatic tension produced by the sounds leading up to the visual presentation. For example, an otherwise serene ocean in the movie Jaws is made terrifying by the simple but ominous double beat rhythm introducing the shark. Evoking inexorable dread, the audio track prepares viewers for the image—made searing through its heightened anticipation—of the leviathan's appearance.

It is not only the perception of visual stimuli that is altered by an accompanying soundtrack, however. The sensations associated with physical activity are susceptible to the effects of audio accompaniment as well. High energy, syncopated rhythms, for example, are purposefully incorporated into audio accompaniments to exercise sessions, enlivening otherwise routine and repetitive physical movements, and even causing exercise participants to voluntarily increase the tempo of their exercise efforts. In another setting, inspiring or emotionally evocative music may be used by endurance athletes to delay the dispiriting effects of muscle fatigue, allowing those athletes to intensify their efforts or to ward off the symptoms of physical exhaustion. Audio enhancements are utilized in the context of physically interactive entertainment venues as well. What parade or political rally, for instance, is not made bolder and more dramatic as a result of the unrelenting enthusiasm of an accompanying band.

Despite the power of audio accompaniment to enhance an activity or experience, the enhancement provided may be a qualified one where listeners are limited to an audio soundtrack selected for presentation to a general audience, and over which they have little or no control as individual listeners. This is indeed the conventional approach to providing audio accompaniment, as may be seen from a visit to a movie theater, sporting event, parade, or exercise studio, where a venue wide sound system typically delivers the same audio selections to everyone present.

Figure 1:
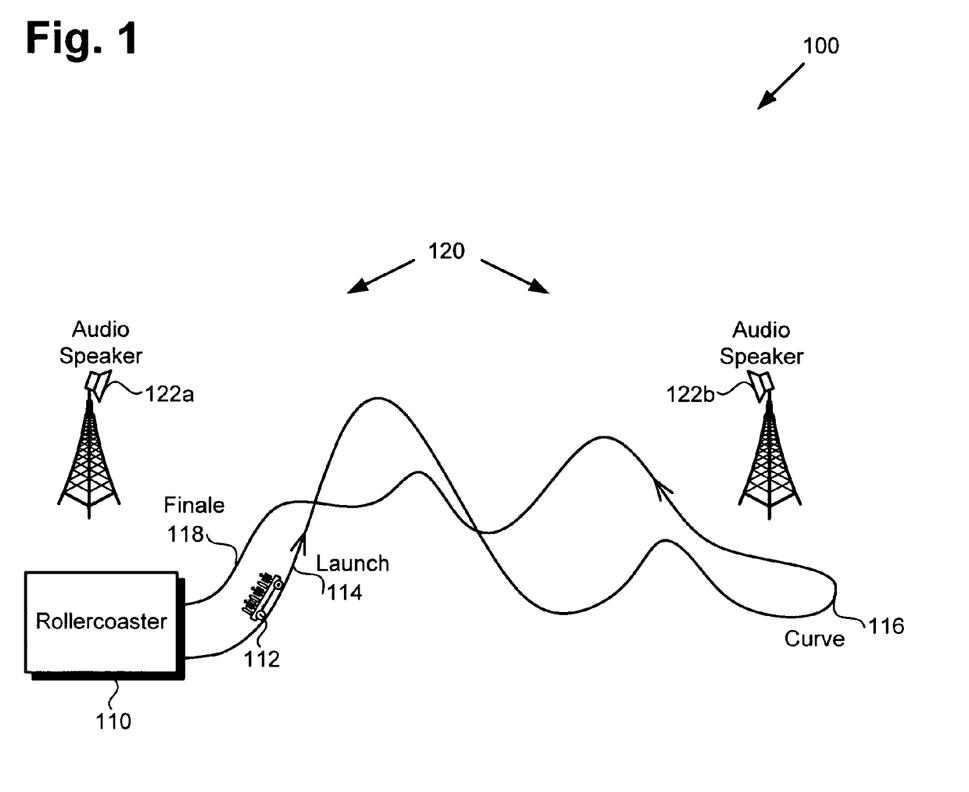
FIG. 1 is a diagram showing a conventional audio presentation accompanying a theme park ride.

An example of the conventional approach is provided by FIG. 1, which adopts an exemplary theme park environment for reference. FIG. 1 is a diagram showing a conventional audio presentation accompanying a theme park ride, in this instance, a rollercoaster. As shown in FIG. 1, theme park ride 100 comprises rollercoaster 110 and rollercoaster sound system 120 providing audio accompaniment to the rollercoaster ride. Rollercoaster 110 includes rollercoaster train 112 carrying riders through distinct ride events, such as launch event 114, curve event 116, and finale event 118. A shared audio experience is provided by rollercoaster sound system 120, which includes audio speakers 122a and 122b located along the path of the rollercoaster ride. Audio speakers 122a and 122b may be utilized to broadcast an audio accompaniment to the rollercoaster ride that corresponds in theme and duration to the events of the ride. Rollercoaster sound system 120 may be used to provide an audio presentation that starts with the beginning of the rollercoaster ride, and ends with the end of the ride.

An exciting audio segment may be selected for presentation during a pre-launch interval, for example, or be timed to coincide with launch event 114. Another audio segment, perhaps including sounds of screaming, may be selected for presentation when rollercoaster train 112 approaches curve event 116, while yet another audio segment having a reduced tempo may be presented during finale event 118, preparing rollercoaster train passengers for transition out of the rollercoaster environment. The approach shown in FIG. 1, however, results in a generic audio experience for the individual riders of rollercoaster 110, thereby limiting the effectiveness of the audio presentation as a ride enhancement.

As personal experience can readily confirm, the psychological impact of an audio effect may be quite personal. For example, different individuals possess different tolerances for stress and stimulation, so that an audio effect providing a pleasurable level of excitement for one listener, may make another unpleasantly uneasy. Similarly, variations in age and aesthetic sensibility may shape an individual response to a musical selection. Where one person may find the music of one of the great romantic composers like Brahms, Rachmaninoff, or Wagner, to be emotionally evocative and enjoyable, another listener may be put off by those selections, preferring the contemporary excitement of Beyonce, Christina Aguilera, or an artist from entirely different musical genre.

Accordingly, there is a need to overcome the drawbacks and deficiencies in the art by providing a solution enabling an individual to personalize an audio accompaniment to a ride or event in order to enhance their own enjoyment of that experience.

SUMMARY OF THE INVENTION

A method and system providing a customized audio presentation tailored to a predetermined event sequence, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a method and system providing a customized audio presentation tailored to a predetermined event sequence. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Figure 2A:
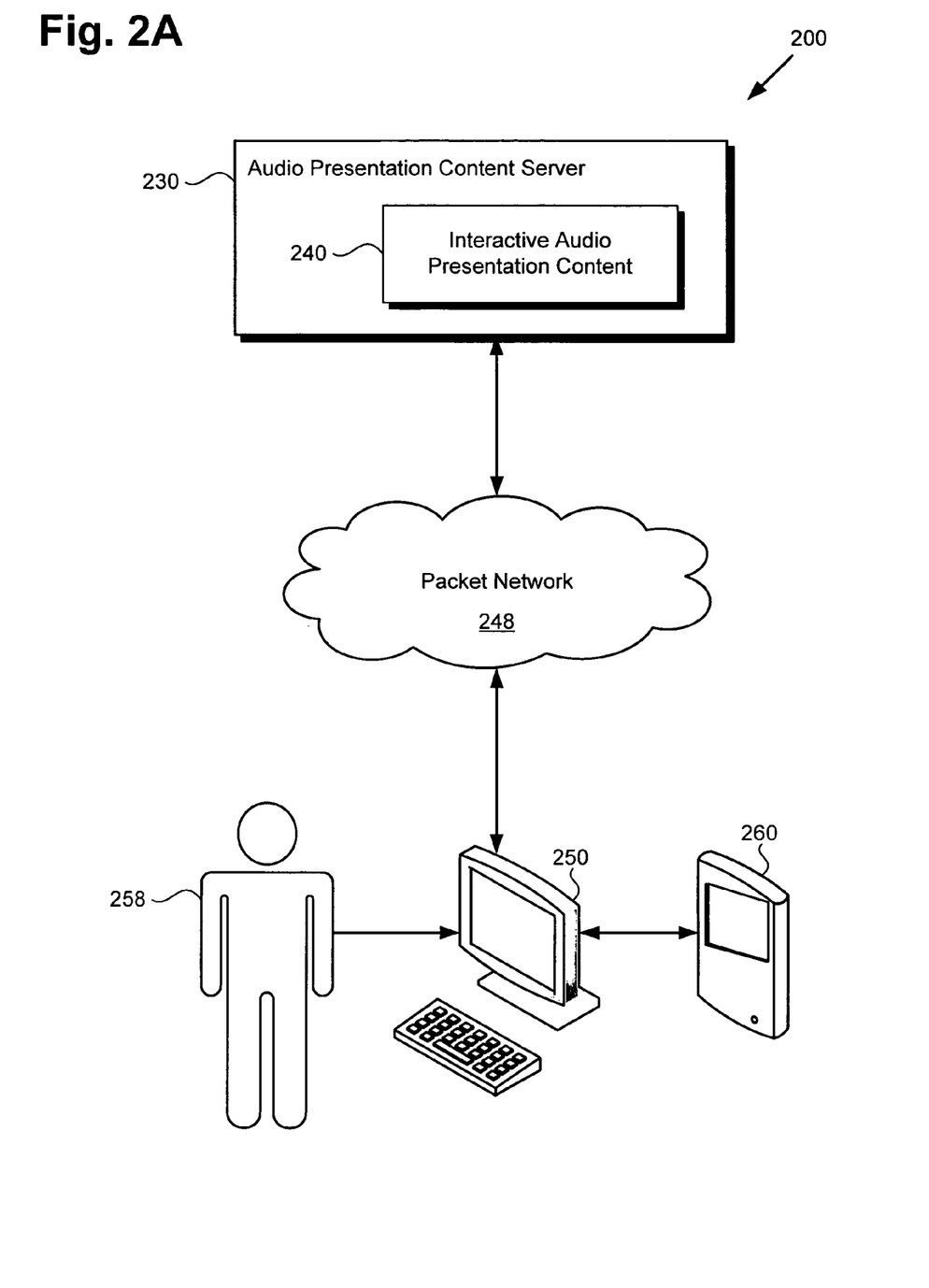
FIG. 2A shows a diagram of an exemplary system providing a customized audio presentation tailored to a predetermined event sequence, according to one embodiment of the present invention.

FIG. 2A shows a diagram of exemplary system 200 providing a customized audio presentation tailored to a predetermined event sequence, according to one embodiment of the present invention. In the embodiment of FIG. 2A, system 200 comprises audio presentation content server 230 including interactive audio presentation content 240, packet network 248, client computer 250, and portable audio player 260. Also shown in FIG. 2A is user 258.

According to the embodiment of FIG. 2A, user 258 may utilize client computer 250 and packet network 248 to access interactive audio presentation content 240 stored on audio presentation content server 230. User 258 may then use interactive audio presentation content 240 to customize an audio presentation tailored to a predetermined event sequence, such as theme park ride 100, in FIG. 1. User 258 may subsequently transfer the customized audio presentation to portable audio player 260, for enjoyment concurrently with the predetermined event sequence to which the customized audio presentation is tailored. Although in the embodiment of FIG. 2A, client computer 250 is represented as a personal computer (PC), in one embodiment client computer 250 may be a mobile communication device such as a tablet computer, mobile telephone, or personal digital assistant (PDA), for example. Moreover, although according to the present embodiment, client computer 250 and portable audio player 260 are separate devices, in one embodiment, they may be integrated into a single mobile communication device.

As shown in FIG. 2A, interactive audio presentation content 240 may be accessed through packet network 248. In that instance, interactive audio presentation content 240 may comprise a web application, accessible over a packet network such as the Internet, for example. Alternatively, interactive audio presentation content 240 may reside on a server supporting a local area network, in the theme park context, for instance, or included in another type of limited distribution network. In another embodiment, interactive audio presentation content 240 may be stored on a portable computer readable storage medium such as a compact disc read-only memory (CD-ROM).

Figure 2B:
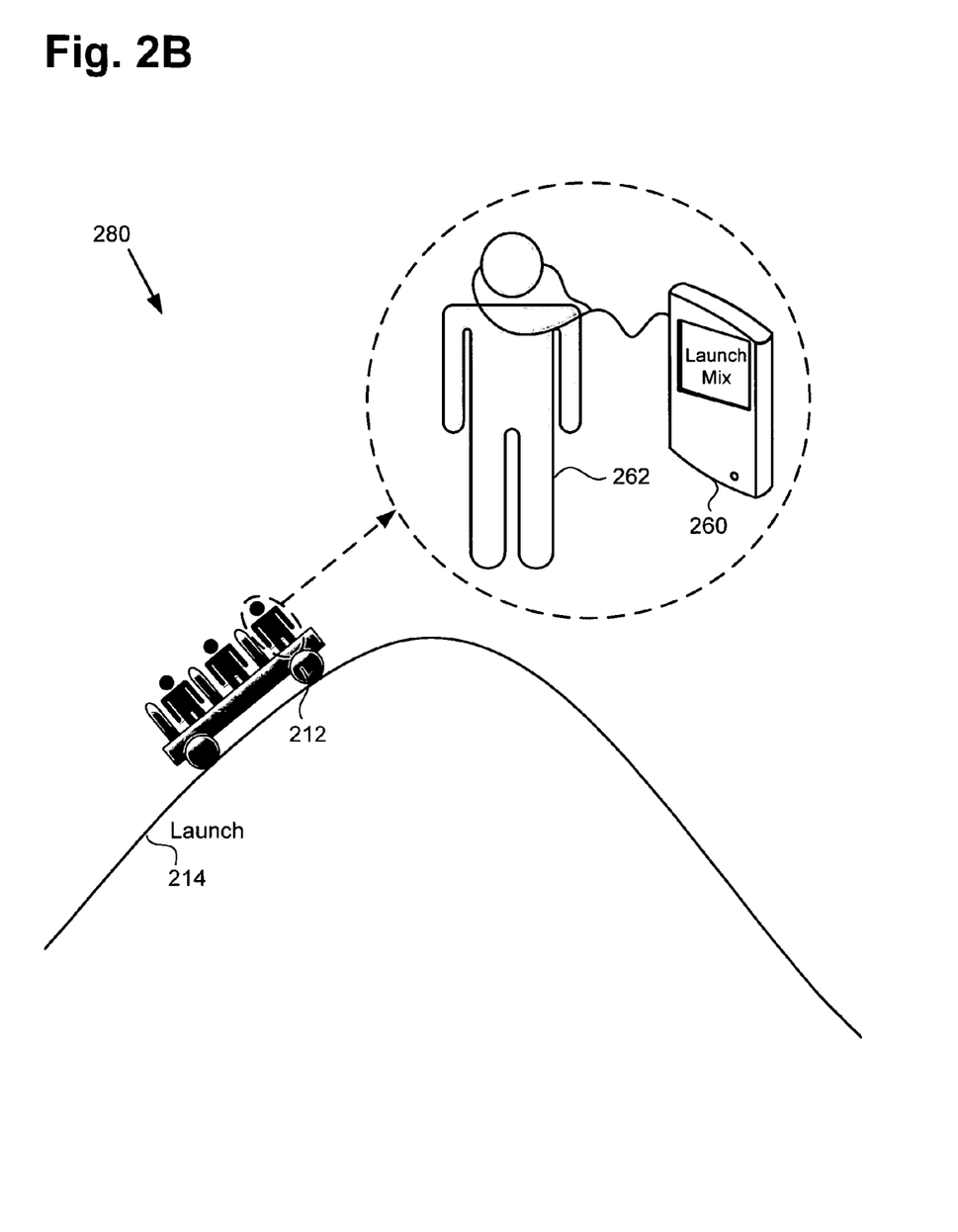
FIG. 2B shows an implementation of the system of FIG. 2A providing a customized audio presentation tailored to the theme park ride of FIG. 1.

Continuing to FIG. 2B, FIG. 2B shows a result of implementing the system of FIG. 2A to provide a customized audio presentation tailored to the theme park ride of FIG. 1. Roller coaster ride section 280 includes rollercoaster train 212 during launch event 214, corresponding respectively to rollercoaster train 112 during launch event 114, on rollercoaster 110 in FIG. 1. FIG. 2B also shows individual listener 262, and portable audio player 260. It is noted that although individual listener 262, in FIG. 2B, may in one embodiment correspond to client computer user 258 in FIG. 2A, in another embodiment individual listener 262 is another individual, for whom a customized audio presentation has been provided.

Although the embodiment of FIG. 2B represents playback of a customized audio presentation by portable audio player 260, in one embodiment, playback may occur through a mobile communication device merging client computer 250 and portable audio player 260. In another embodiment, the described mobile communication device or portable audio player 260 may interact with an existing onboard theme park ride sound system (not shown) to playback the customized audio presentation via that onboard audio equipment. For example a theme park ride might be equipped with personal ride vehicles, providing a guest with greater control over the ride experience than might be available riding on rollercoaster train 212. In that case, individual listener 262 might access an onboard sound system provided on the personal ride vehicle through a wired or wireless connection with the described mobile communication device or portable audio player on which the customized audio presentation is loaded.

Where an onboard sound system is provided, and configured to provide a predetermined audio experience to a theme park guest, connection of the mobile communication device or portable audio player 260 to the onboard sound system in the manner described could enable individual listener 262 to substitute a customized audio presentation for the predetermined audio experience provided as part of the theme park ride. In yet another embodiment, the customized audio presentation may be associated with a user access code enabling a theme park guest to access the customized audio presentation in-park, by means of the user access code. In that embodiment, the customized audio presentation may be stored on audio presentation content server 230, for example, and adapted as an in-park customized audio presentation available to individual listener 262 on a subsequent visit, perhaps to be played back using the onboard sound system provided on the ride vehicle.

As can be seen from FIGS. 2A and 2B, access to interactive audio presentation content 240 by client computer 250 permits user 258 to prepare an audio presentation usable by individual listener 262 during the predetermined events constituting theme park ride 100, in FIG. 1, such as launch event 214 in FIG. 2B. Interactive audio presentation content 240 comprises resources, to be more fully elaborated in relation to following FIG. 3, which allow a custom audio presentation prepared using computer 250, to be tailored to the events of a predetermined event sequence, such as theme park ride 100. As a result, the system of FIG. 2A may be utilized to provide an audio presentation customized to reflect the personal preferences of individual listener 262, while concurrently being tailored so as to possess synchronicity with the events of rollercoaster 110.

Figure 3:
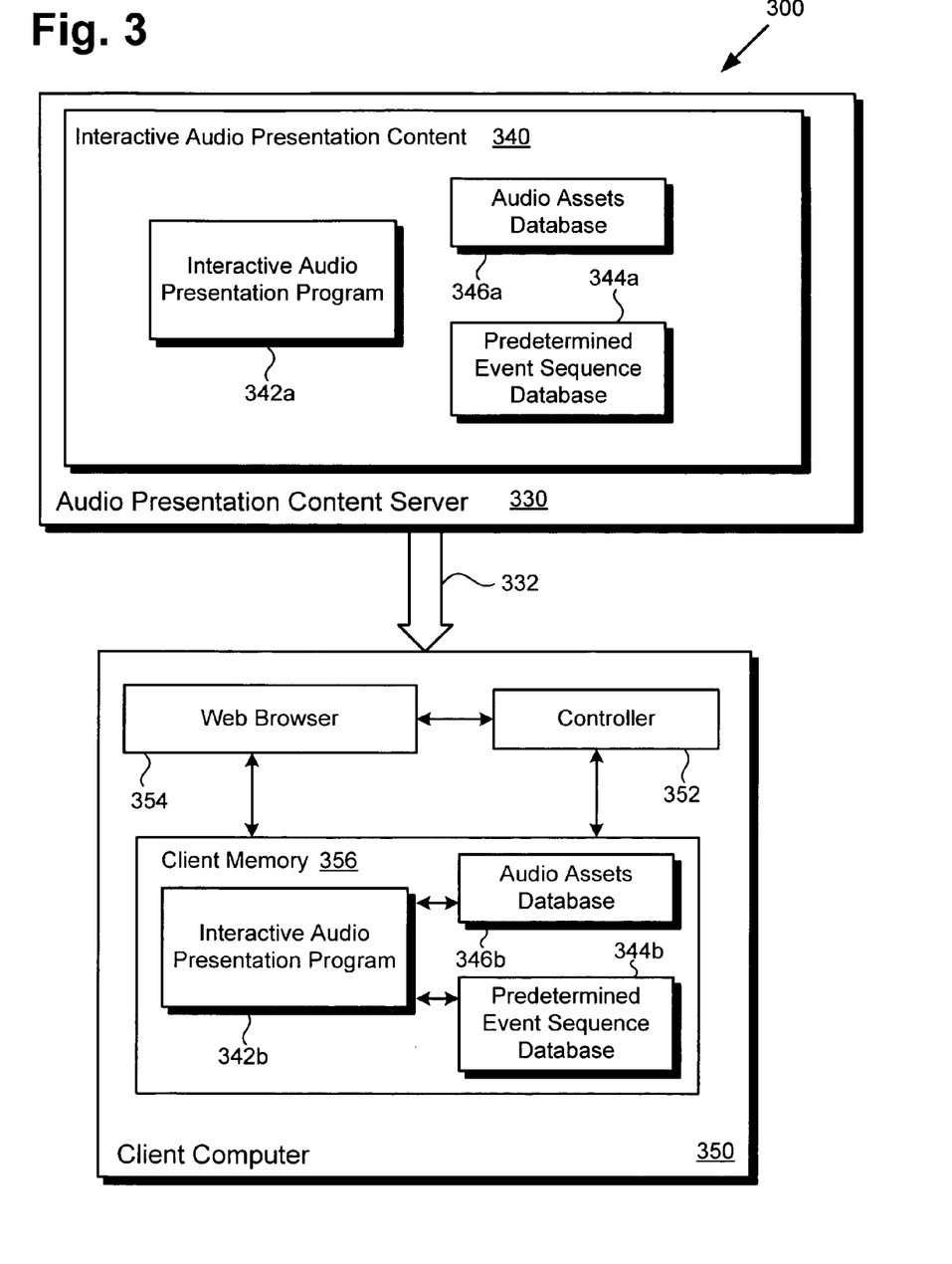
FIG. 3 shows exemplary interactive audio presentation content provided on the audio presentation content server of FIG. 2A, in conjunction with a client computer, according to one embodiment of the present invention.

FIG. 3 provides a more detailed embodiment showing exemplary interactive audio presentation system 300. Interactive audio presentation system 300 in FIG. 3 includes client computer 350 receiving download 332 from audio presentation content server 330 including interactive audio presentation content 340. Client computer 350 corresponds to client computer 250, in FIG. 2A. As shown in FIG. 3, client computer 350 comprises controller 352, web browser 354, and client memory 356.

Audio presentation content server 330 and interactive audio presentation content 340 correspond respectively to audio presentation content server 230 and interactive audio presentation content 240, in FIG. 2A. As shown in FIG. 3, interactive audio presentation content 340 comprises interactive audio presentation program 342a, predetermined event sequence database 344a, and audio assets database 346a. Also shown in FIG. 3 are interactive audio presentation program 342b, predetermined event sequence database 344b, and audio assets database 346b.

In the present embodiment, interactive audio presentation program 342b, predetermined event sequence database 344b, and audio assets database 346b are located in client memory 356, having been received from audio presentation content server 330 via download 332. In one embodiment, download 332 corresponds to transfer of interactive audio presentation program 342a, predetermined event sequence database 344a, and audio assets database 346a over a packet network, for example. In another embodiment, the download may correspond to transfer of interactive audio presentation program 342a, predetermined event sequence database 344a, and audio assets database 346a from a CD-ROM or other portable computer readable storage medium. Once downloaded, the various interactive audio presentation content components, including interactive audio presentation program 342b, predetermined event sequence database 344b, and audio assets database 346b may be stored in client memory 356 and run locally on client computer 350.

Controller 352 may be the central processing unit for client computer 350, for example, in which role controller 352 runs the client computer operating system, launches web browser 354, and facilitates execution of interactive audio presentation program 342b. Web browser 354, under the control of controller 352, may execute interactive audio presentation program 342b to enable a user of client computer 350 to customize an audio presentation utilizing audio effects from audio assets database 346b, and tailored to event parameters stored in predetermined event sequence database 344b. Although in one embodiment, interactive audio presentation program 342b may draw audio effects exclusively from audio assets database 346b, in other embodiments audio effects may be imported from audio asset sources other than or in addition to audio assets database 346b, such as other locations in client memory 356 or an external memory device like a music CD-ROM, for example. In one embodiment, audio assets database 346b is expandable by a user of client computer 350, so that audio effects personal to the user, local to client computer 350, or available through communication with a remote system or network may be added to assets received with audio assets database 346b.

Implementation of the embodiment of FIG. 3 permits a user of client computer 350 to run interactive audio presentation program 342b to customize an audio presentation and tailor the customized audio presentation to an event sequence stored in predetermined event sequence database 344b. Returning to the example provided by theme park ride 100 in FIG. 1, the embodiment of FIG. 3 permits a user of client computer 350 to identify theme park ride 100 as a selected predetermined event sequence from predetermined event sequence database 344b. Utilizing event parameters corresponding to theme park ride 100, and stored in predetermined event sequence database 344b, interactive audio presentation program 342b enables the computer user to associate audio assets of their choice with the discrete events constituting theme park ride 100. Through that process, one or more audio assets may be associated with each of launch event 114, curve event 116, and finale event 118, for example. Interactive audio presentation program 342b then enables the user of client computer 350 to synchronize the timing of an audio asset with the timing of its associated event, within the context of the identified predetermined event sequence.

Figure 4:
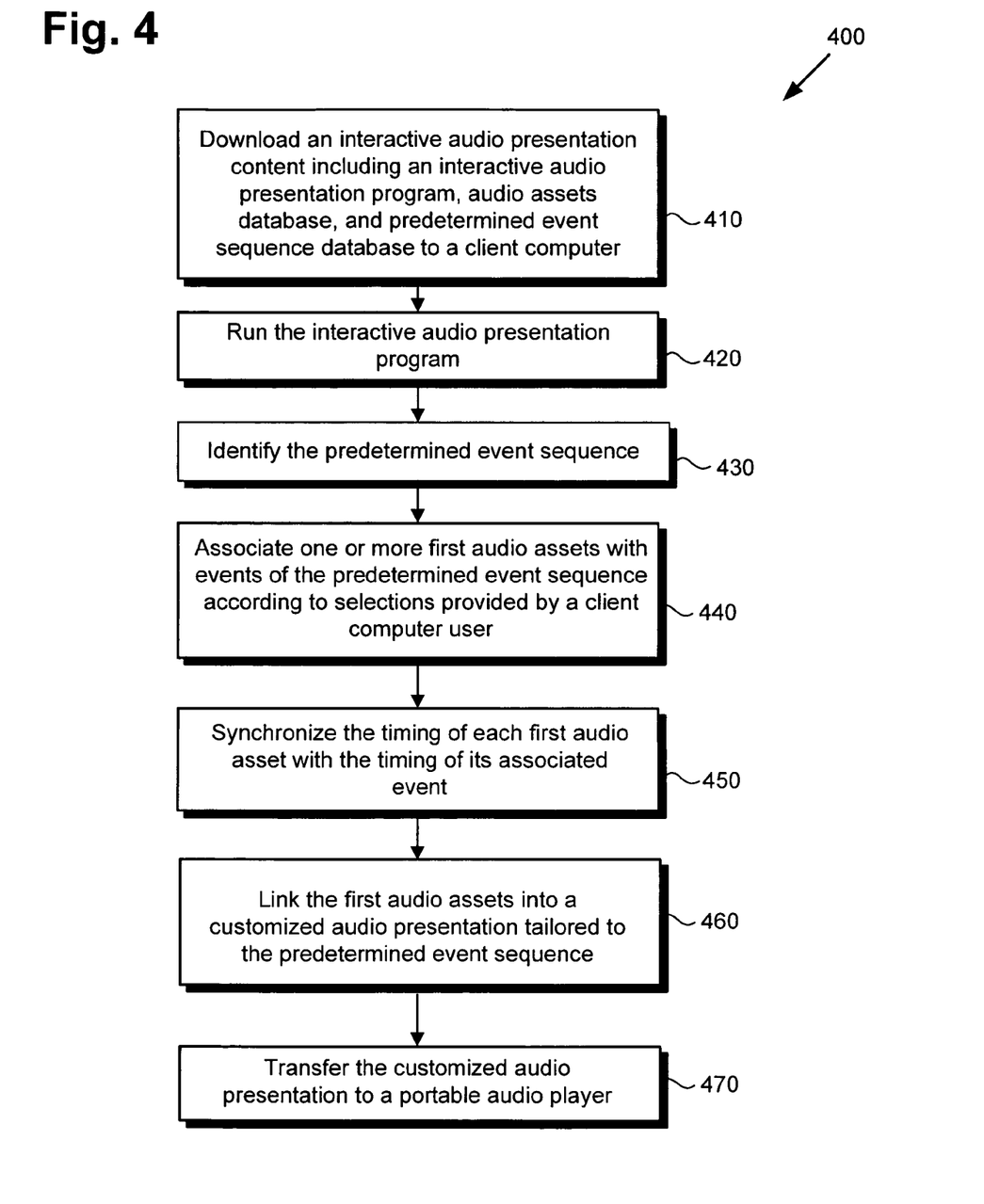
FIG. 4 is a flowchart presenting a method of providing a customized audio presentation for tailoring to a predetermined event sequence, according to one embodiment of the present invention.

FIGS. 2A, 2B, and 3 are now further described in conjunction with FIG. 4, which presents an exemplary method for providing a customized audio presentation tailored to a predetermined event sequence. Certain details and features have been left out of flowchart 400 that are apparent to a person of ordinary skill in the art. For example, a step may consist of one or more substeps or may involve specialized equipment or materials, as known in the art. While steps 410 through 470 indicated in flowchart 400 are sufficient to describe one embodiment of the present method, other embodiments may utilize steps different from those shown in flowchart 400, or may include more, or fewer steps.

Starting with step 410 in FIG. 4 and system 300 in FIG. 3, step 410 of flowchart 400 comprises downloading an interactive audio presentation content 340 including interactive audio presentation program 342a, audio assets database 346a, and predetermined event sequence database 344a to client computer 350. Although in the present exemplary method interactive audio presentation content is downloaded, in another embodiment interactive audio presentation content 340 may be provided, either on audio presentation content server 330, or through some other source. As previously described, the interactive audio presentation content may be provided for download over a packet network like the Internet, over a limited distribution network, or from a portable computer readable storage medium such CD-ROM.

The exemplary method of flowchart 400 continues with step 420, which comprises running interactive audio presentation program 342b on client computer 350. Step 420 permits a user of client computer 350 to access information defining predetermined event sequences stored in predetermined event sequence database 344b, and utilize that information to appropriately modify audio assets selected to accompany the events of the predetermined event sequence.

Flowchart 400 continues with step 430, comprising identifying the predetermined event sequence from predetermined event sequence database 344b. In the example shown in FIG. 2B, the identified predetermined event sequence comprised a rollercoaster ride including launch event 214. In other embodiments, however, a predetermined event sequence may correspond to an interactive sequence, such as a guided exploration of a museum, landmark, or other point of interest, for example. In one embodiment, a predetermined event sequence may correspond to a tour of a geographical region. In still another embodiment, a predetermined event sequence may correspond to activities in an exercise routine or athletic event, such as traversal of a fitness par course, for example.

In step 440 of flowchart 400, a first audio asset is associated with each of one or more selected events of the predetermined event sequence identified in step 430 to produce associated one or more first audio assets. According to the preferences of the individual for whom the customized audio presentation is being prepared, one, more than one, or all events comprised by the predetermined event sequence may be selected for association with a first audio asset. A first audio asset may comprise music, a sound effect such as screaming or a rocket engine, for example, or a narrative or instructional segment. Although the present exemplary method describes selection of only a first audio asset for association with each selected event, in other embodiments, a second, or more additional audio assets may be associated with each selected event to produce associated one or more second, third, etcetera, audio assets. For example, in one embodiment launch event 214 in FIG. 2B may be associated with a first audio asset comprising a musical passage, a second audio asset comprising a sound effect, and a third audio asset, perhaps comprising a second sound effect. All three selected audio assets would be associated with launch event 214 and be suitably presented during launch event 214.

Step 450 comprises synchronizing the timing of the first audio assets with the timing of each event with which they were associated in the previous step to produce associated and synchronized one or more first audio assets. As used in the present application, the expression "timing" embraces consideration of a start time, an end time, a time duration, and/or any timing relation. Thus, synchronizing the timing of the first audio assets may include matching their time duration to the time duration of their associated events, or having them begin and/or end at a specified time during the time duration of their associated events, for example. Where, as was described in relation to previous step 440, multiple audio assets are associated with an event, synchronizing the audio assets produces associated and synchronized one or more second, third, etcetera, audio assets.

Continuing with step 460 of flowchart 400, step 460 comprises linking the respective first audio assets into a customized audio presentation tailored to the predetermined event sequence. Linking the selected audio assets previously synchronized to individual events into a presentation tailored to the event sequence may provide synchronicity between the presentation as a whole, and the entirety of the predetermined event sequence. In one embodiment, linking the audio assets may comprise combining them in a serial fashion, so that an early asset associated with an early event transitions abruptly to a subsequent asset associated with a subsequent event. In another embodiment, linking the audio assets may comprise mixing them to produce a seamless presentation in which sequential audio assets may cross-dissolve into one another, providing a continuous audio experience. Where, for example, second or more additional audio assets are associated and synchronized with selected events, linking may include combining, or mixing, those respective multiple assets with one another and the first respective audio asset.

In step 470 the customized audio presentation produced in step 460, having been personalized to correspond to an individual listener's tastes, and tailored to synchronize with a predetermined event sequence, is transferred to a portable audio player. The portable audio player, such as portable audio player 260 in FIGS. 2A and 2B may be any portable audio device suitable for receiving files or media via client computer 250 and providing playback to individual listener 262. For example, portable audio player 260 may comprise a digital media player such as an IPod, a portable compact disc (CD) player, or a mobile communication device such as a cellular phone. Transfer may be achieved through playback of a rendered storage medium, such as a CD, or through a wired or wireless data transfer to portable audio player 260.

Although in the present embodiment, the customized audio presentation produced in step 460 is transferred to a portable audio player, in another embodiment, the custom audio presentation may be associated with a user access code. In that embodiment, the customized audio presentation need not be transferred to a portable audio player or other personal playback device, but may be saved, for subsequent access by means of the user access code. For example, a prospective them park guest may produce a customized audio presentation, save that customized audio presentation to a theme park hosted customized audio presentation storage, and then retrieve the customized audio presentation in-park, by the user access code, for playback over a sound provided on a theme park ride vehicle.

Figure 5:
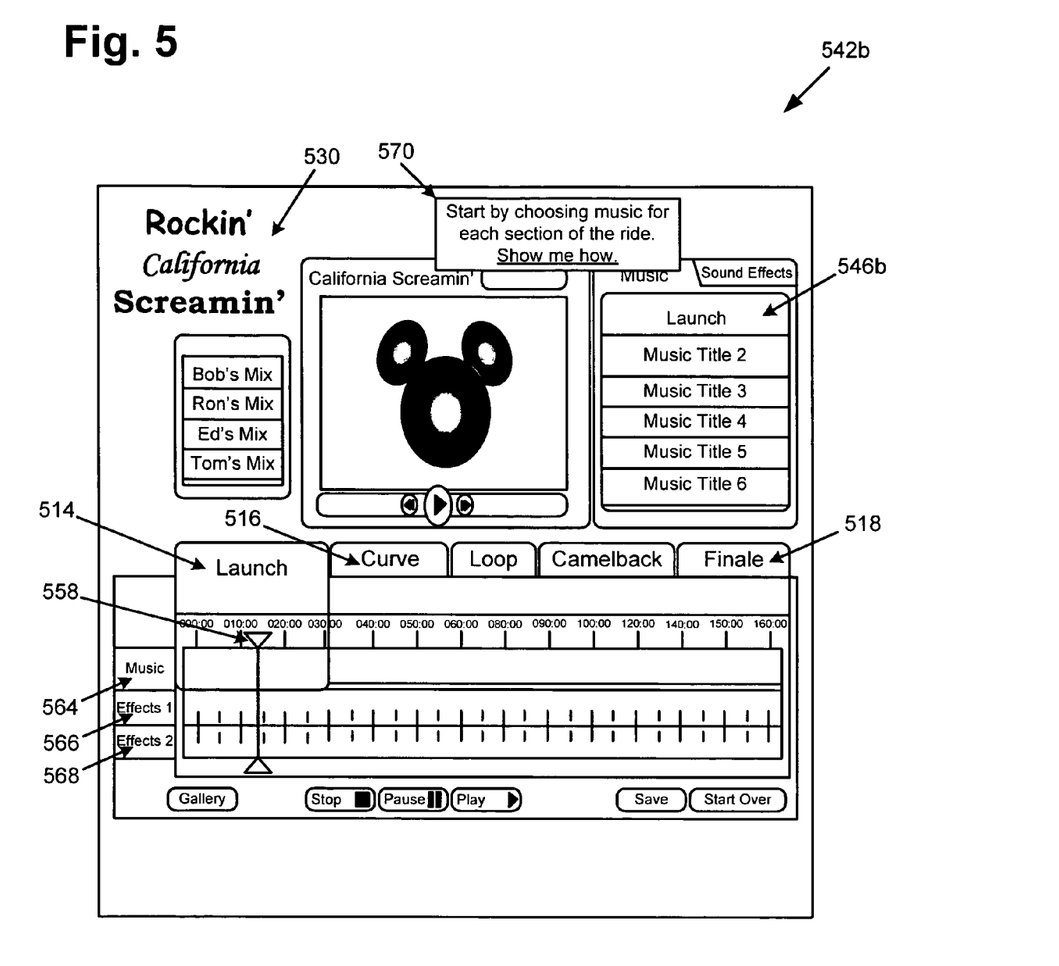
FIG. 5 shows an exemplary implementation in which a first audio asset is associated with a first event of a predetermined event sequence corresponding to a theme park ride, according to one embodiment of the present invention.

Turning to FIG. 5, FIG. 5 shows an exemplary implementation in which a first audio asset is associated with a first event of a predetermined event sequence corresponding to a theme park ride, according to one embodiment of the present invention. Shown in FIG. 5 is a segment of exemplary interactive audio presentation program 542b running on a client computer. Exemplary interactive audio presentation program 542b corresponds to interactive audio presentation program 342b, in FIG. 3, and may be running on client computer 350 in that figure, for example. A user of client computer 350 may utilize interactive audio presentation program 542b to customize an audio presentation and tailor it to the predetermined event sequence corresponding to theme park ride Rockin' California Screamin' 530.

The interactive audio presentation program segment shown in FIG. 5 may be seen to correspond to step 440 of flowchart 400. Prior to the segment shown in FIG. 5, the interactive audio presentation content including interactive audio presentation program 542b would have been downloaded and run on a client computer, according to steps 410 and 420 of flowchart 400. In addition, the client computer would have been utilized to identify Rockin' California Screamin' 530 as the selected predetermined event sequence from a predetermined event sequence database (not represented in FIG. 5), during step 430.

According to the interactive audio presentation program segment shown in FIG. 5, a user of client computer 350 is shown instruction 570 prompting an interactive selection of first audio asset 564 for association with the events comprised by Rockin' California Screamin' 530. As can be seen from FIG. 5, those events include launch event 514, curve event 516, and finale event 518, which are analogous to launch event 114, curve event 116, and finale event 118 on the path of rollercoaster 110, in FIG. 1. Performing step 440 of flowchart 400, a user of client computer 350 may associate first audio asset 564 with launch event 514, by selecting a desired audio asset from audio assets database 546b. In the present embodiment, audio assets database 546b is expandable, so that in addition to preloaded audio assets received at the time of download, additional audio assets may be placed into audio assets database 546b by a user of client computer 350.

Once an association has been made between first audio asset 564 and launch event 514, timing information 558 extracted from the predetermined event sequence database (not represented in FIG. 5) may be provided by interactive audio presentation program 542b, enabling a computer user to synchronize the first audio asset with its associated event. In the particular example shown in FIG. 5, synchronizing step 450 of flowchart 400 includes synchronizing a music choice with launch event 514. According to the embodiment of FIG. 5, additional second and third audio assets can be associated with each event of the predetermined event sequence comprised by Rockin' California Screamin' 530, providing even more customizing options.

Thus, the present application discloses a method and system providing a customized audio presentation tailored to a predetermined event sequence. By enabling an individual listener to choose the audio selections included in an accompaniment to one or more events, one embodiment of the present invention provides a customized audio presentation according to the preferences of that individual listener. By further enabling the individual listener to synchronize the customized audio presentation with the timing of the events it is to accompany, one embodiment of the present invention permits the individual listener to tailor the customized audio presentation to a desired event sequence.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A method of customizing an audio presentation for tailoring to a predetermined event sequence, the method comprising:
   identifying the predetermined event sequence from a predetermined event sequence database, wherein the predetermined event sequence comprises a theme park ride event sequence;
   associating one or more first audio assets with respective one or more selected events of the predetermined event sequence to produce associated one or more first audio assets;
   synchronizing a timing of the associated one or more first audio assets with a timing of the respective one or more selected events to produce associated and synchronized one or more first audio assets; and
   linking the associated and synchronized one or more first audio assets to produce a customized audio presentation tailored to the predetermined event sequence.

2. The method of claim 1, wherein the one or more first audio assets comprise music.

3. The method of claim 1, further comprising downloading an interactive audio presentation content including an interactive audio presentation program, an audio assets database, and the predetermined event sequence database to a client computer.

4. The method of claim 3, further comprising running the interactive audio presentation program on the client computer.

5. The method of claim 3, wherein at least one of the one or more first audio assets is selected from the audio assets database.

6. The method of claim 3, wherein at least one of the one or more first audio assets is provided by the client computer.

7. The method of claim 3, further comprising transferring the customized audio presentation to a portable audio player.

8. The method of claim 1, further comprising providing an interactive audio presentation content including an interactive audio presentation program, an audio assets database, and the predetermined event sequence database.

9. The method of claim 8, wherein at least one of the one or more first audio assets is selected from the audio assets database.

10. The method of claim 8, wherein at least one of the one or more first audio assets is provided by a client computer.

11. The method of claim 8, further comprising sending the customized audio presentation to a portable audio player.

12. The method of claim 1, further comprising associating one or more second audio assets with respective one or more selected events of the predetermined event sequence to produce associated one or more second audio assets.

13. The method of claim 12, wherein the one or more second audio assets comprise sound effects.

14. The method of claim 12, further comprising synchronizing a timing of the associated one or more second audio assets with the timing of the respective one or more selected events of the predetermined event sequence to produce associated and synchronized one or more second audio assets.

15. The method of claim 14, further comprising mixing the associated and synchronized one or more second audio assets with the associated and synchronized one or more first audio assets.

16. The method of claim 1, further comprising associating the customized audio presentation with a user access code.

17. The method of claim 16, further comprising enabling a theme park guest to access the customized audio presentation in-park by the user access code.

18. A system for customizing an audio presentation tailored to a predetermined event sequence, the system comprising: a client computer;
   a client memory located on the client computer;
   and an interactive audio presentation content including an interactive audio presentation program, an audio assets database,
   and a predetermined event sequence database, stored in the client memory,
   the interactive audio presentation content enabling a user of the client computer to select the predetermined event sequence and produce a customized audio presentation tailored to the predetermined event sequence, wherein the predetermined event sequence comprises a theme park ride event sequence.

19. The system of claim 18, further comprising a portable audio player configured to receive the customized audio presentation tailored to the predetermined event sequence.

20. The system of claim 18, wherein the client computer comprises a mobile communication device.

21. The system of claim 19, wherein the mobile communication device includes a portable audio player.

22. The method of claim 1, wherein the predetermined event sequence comprises predetermined ride events that are to occur during a ride, wherein the associating associates the first audio assets with the ride events.

23. The method of claim 1, wherein the predetermined event sequence comprises predetermined live events are to occur in an entertainment venue, wherein the associating the first audio assets with the predetermined live events that are to occur in the entertainment venue.

* * * * *